(12) United States Patent
Porter

(10) Patent No.: US 9,376,812 B2
(45) Date of Patent: Jun. 28, 2016

(54) CEILING PANEL MOUNTING SYSTEM

(71) Applicant: Charles Porter, Blythewood, SC (US)

(72) Inventor: Charles Porter, Blythewood, SC (US)

(*) Notice: Subject to any disclaimer, the term of this patent is extended or adjusted under 35 U.S.C. 154(b) by 0 days.

(21) Appl. No.: 14/805,129

(22) Filed: Jul. 21, 2015

(65) Prior Publication Data

US 2016/0053489 A1     Feb. 25, 2016

Related U.S. Application Data

(60) Provisional application No. 62/039,294, filed on Aug. 19, 2014.

(51) Int. Cl.
| | |
|---|---|
| *B42F 13/00* | (2006.01) |
| *E04B 9/24* | (2006.01) |
| *F16B 2/06* | (2006.01) |
| *F16M 13/02* | (2006.01) |
| *F16B 2/24* | (2006.01) |
| *F16B 5/02* | (2006.01) |
| *E04B 9/04* | (2006.01) |

(52) U.S. Cl.
CPC ... *E04B 9/24* (2013.01); *E04B 9/04* (2013.01); *F16B 2/065* (2013.01); *F16B 2/245* (2013.01); *F16B 5/0225* (2013.01); *F16M 13/027* (2013.01)

(58) Field of Classification Search
CPC ............. E04B 9/24; E04B 9/04; F16B 2/065; F16B 2/245; F16M 13/027
USPC .............................. 52/506.06, 506.07, 506.08
See application file for complete search history.

(56) References Cited

U.S. PATENT DOCUMENTS

| | | | | |
|---|---|---|---|---|
| 2,108,196 | A * | 2/1938 | Davies ........................ | 248/224.8 |
| 4,068,444 | A | 1/1978 | Ollinger | |
| 4,139,972 | A | 2/1979 | Naka | |
| 7,114,714 | B2 | 10/2006 | Wong | |
| 7,810,775 | B2 | 10/2010 | Dal Ponte et al. | |
| 8,136,311 | B2 * | 3/2012 | Liu .............................. | 52/173.3 |
| 8,297,579 | B1 | 10/2012 | Gretz | |
| 8,365,479 | B2 * | 2/2013 | Tucker ......................... | 52/173.3 |
| 8,413,938 | B2 | 4/2013 | Whelan et al. | |
| 8,632,040 | B2 | 1/2014 | Mass et al. | |
| 2003/0015637 | A1 * | 1/2003 | Liebendorfer ............... | 248/237 |
| 2009/0019796 | A1 * | 1/2009 | Liebendorfer ............... | 52/173.3 |
| 2009/0242014 | A1 * | 10/2009 | Leary ........................... | 136/251 |

(Continued)

FOREIGN PATENT DOCUMENTS

| | | |
|---|---|---|
| EP | 0089718 B1 | 7/1987 |
| JP | 2693699 B2 | 12/1997 |
| JP | 2004044153 A | 2/2004 |

*Primary Examiner* — James Buckle, Jr.
(74) *Attorney, Agent, or Firm* — McNair Law Firm, P.A.; Seann P. Lahey

(57) ABSTRACT

A plurality of carrying bars defining a suspended mounting grid. A bracket having a U-shaped central portion defining a mounting channel receiving a portion of said carrying bars. The bracket has a first support arm extending laterally outward from a first side of said central portion, and a second support arm extending laterally outward from a second side of said central portion. A keyway is disposed in each of said first and second support arms. A ceiling panel having a ceiling panel connecting member engages said keyway in either of said first support arm or said second support arm of said bracket so that said ceiling panel is carried by said bracket on said carrying bars. A securing clip carried on each of said first and second support arms engaging said ceiling panel connecting member to resist removal of said ceiling panel connecting member from said keyway.

19 Claims, 4 Drawing Sheets

(56) References Cited

U.S. PATENT DOCUMENTS

| | | | |
|---|---|---|---|
| 2011/0162300 A1* | 7/2011 | Johnson | 52/173.3 |
| 2012/0124922 A1* | 5/2012 | Cusson et al. | 52/173.3 |
| 2013/0091786 A1* | 4/2013 | DuPont et al. | 52/173.3 |
| 2013/0104471 A1* | 5/2013 | Kobayashi | 52/173.3 |
| 2013/0186017 A1* | 7/2013 | Kassem | 52/173.3 |
| 2013/0192150 A1* | 8/2013 | DuPont et al. | 52/173.3 |

* cited by examiner

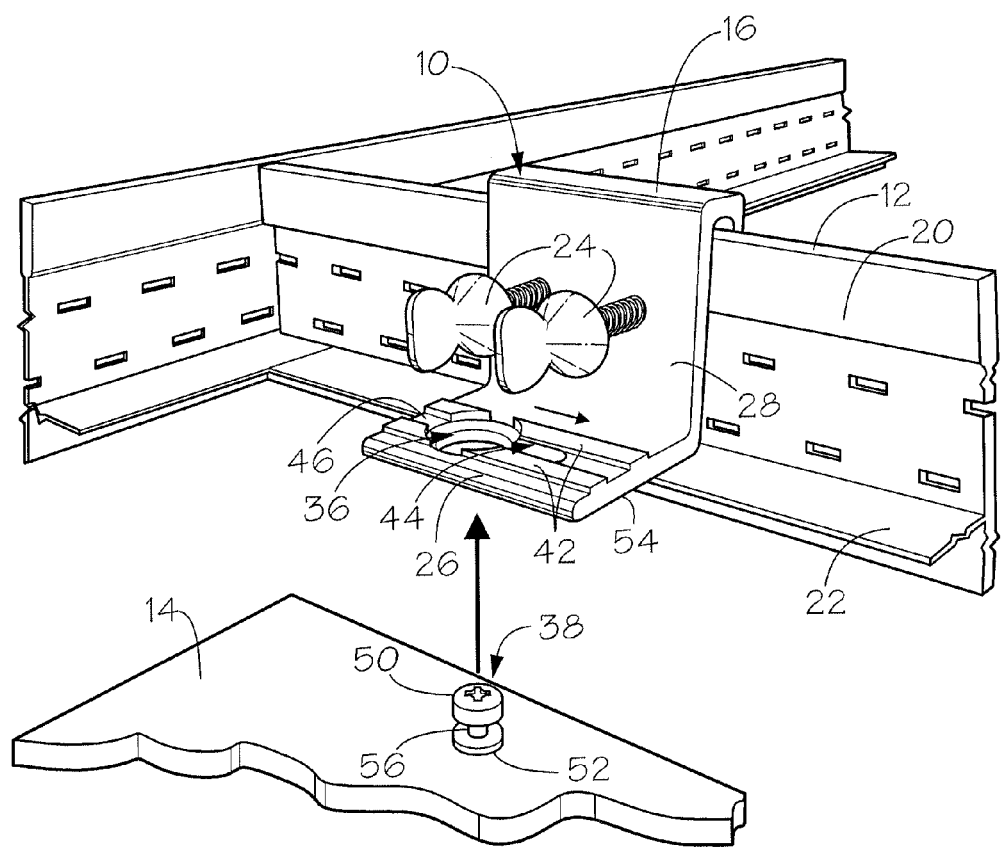
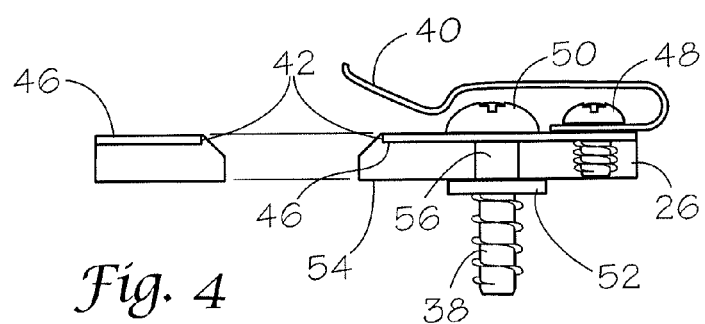

CEILING PANEL MOUNTING SYSTEM

BACKGROUND OF THE INVENTION

1) Field of the Invention

The present invention relates to mounting hardware for hanging items, and more particularly, to a system for removably mounting paneling to a ceiling.

2) Description of Related Art

Ceiling paneling is a popular covering but can be problematic to install because it must be properly aligned, securely mounted, the front surface must remain intact, it is often heavy, and it is difficult to work with because the panels are typically large and cumbersome.

Some installations of paneling are achieved by directly adhering a panel to a surface using an adhesive. This is undesirable because it does not accommodate for panel movement due to expansion and contraction, and can damage the panels if removal is required. Furthermore, when used in a ceiling application, adhesive is not a desirable connector for supporting large and relatively heavy paneling.

The prior art is replete with various connectors for hanging small and light tiles from a ceiling. A common problem with such systems is that the ceiling panels may be easily dislodged, allowing the panel to separate from the ceiling mounting system and fall, such as during an earthquake event. More robust and secure mounting means are needed when attempting to mount larger and heavier paneling to a ceiling.

Accordingly, it is an object of the present invention to provide a ceiling panel mounting system that is simple, strong, and precise, yet still allows for the movement of panels after installation to accommodate for expansion and contraction of the panel materials without a concern of dislodging of the panels from the mounting system.

It is a further object of the present invention to provide a ceiling panel mounting system that is configured to securely hold the ceiling panel, while still allowing for easy removal if necessary.

SUMMARY OF THE INVENTION

The above objectives are accomplished according to the present invention by providing a bracket for mounting ceiling panels to suspended carrying bars, said bracket comprising a U-shaped central portion defining a mounting channel adapted to receive a portion of the suspended carrying bars; a first support arm extending laterally outward from a first side of said central portion and perpendicular to a first axis defining a depth of said mounting channel; a second support arm extending laterally outward from a second side of said central portion and perpendicular to said first axis; a keyway disposed in each of said first and second support arms receiving a ceiling panel connecting member; and, a securing clip carried on each of said first and second support arms engaging said ceiling panel connecting member to resist removal of said ceiling panel connecting member from said keyway.

In a further advantageous embodiment, the bracket includes at least one adjustable securing member carried by said central portion for releasably engaging said suspended carrying bars.

In a further advantageous embodiment, the at least one adjustable securing member comprises a thumb screw extending into said mounting channel so that rotation of said thumb screw directs engagement and disengagement with said suspended carrying bars.

In a further advantageous embodiment, a first pair of laterally spaced thumb screws are disposed on said first side of said central portion, and a second pair of laterally spaced thumb screws disposed on said second side of said central portion for evenly distributing engagement force loads against said suspended carrying bars.

In a further advantageous embodiment, a plurality of reinforcing bars are included extending across each of said first and second support arms.

In a further advantageous embodiment, said keyway includes a slot portion disposed between at least two of said reinforcing bars.

In a further advantageous embodiment, said securing clip is carried on said reinforcing bars and disposed overtop of said slot portion of said keyway so that said securing clip is spaced from a top surface of said first and second support arms.

In a further advantageous embodiment, said ceiling panel connecting member comprises a double headed mounting screw.

In a further advantageous embodiment, said double headed mounting screw includes a first head carried on top of said reinforcing bars adjacent said slot portion of said keyway when engaging said securing clip in a locked position.

In a further advantageous embodiment, said double headed mounting screw includes a second head engaging a bottom surface of said first and second support arms when in said locked position.

In a further advantageous embodiment, said double headed mounting screw includes a connecting shaft between said first head and said second head, wherein said connecting shaft is disposed in said slot portion of said keyway when in said locked position.

In a further advantageous embodiment, said securing clip comprises a spring clip adapted to releasably engage said ceiling panel connecting member by flexing during engagement to allow for movement of said ceiling panel connecting member within said keyway between a locked position within said spring clip, and an unlocked position outside of said spring clip.

In a further advantageous embodiment, said first and second support arms are aligned in a common plane and located adjacent to a mouth of said mounting channel.

The above objectives are accomplished according to the present invention by providing a ceiling panel mounting system comprising a plurality of carrying bars for defining a suspended mounting grid; a bracket having U-shaped central portion defining a mounting channel adapted to receive a portion of said carrying bars; said bracket having a first support arm extending laterally outward from a first side of said central portion; said bracket having a second support arm extending laterally outward from a second side of said central portion; said bracket having a keyway disposed in each of said first and second support arms; a ceiling panel having a ceiling panel connecting member engaging said keyway in either of said first support arm or said second support arm of said bracket so that said ceiling panel is carried by said bracket on said carrying bars; and, a securing clip carried on each of said first and second support arms engaging said ceiling panel connecting member to resist removal of said ceiling panel connecting member from said keyway.

In a further advantageous embodiment, said carrying bars have a T-shape with a first wall portion extending in a vertical arrangement and a second wall portion extending in a horizontal arrangement.

In a further advantageous embodiment, said mounting channel of said bracket receives said first wall portion of said carrying bars in interlocking engagement.

In a further advantageous embodiment, said first and second support arms engage said second wall portion of said carrying bars when said first wall portion is received into said mounting channel.

In a further advantageous embodiment, at least one adjustable securing member is carried by said central portion for releasably engaging said first wall portion of said carrying bars.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein:

FIG. 3 shows a perspective exploded view of a ceiling panel engaging a bracket according to the present invention;

FIG. 4 shows a cross-section view of a securing clip carried by the bracket according to the present invention;

It will be understood by those skilled in the art that one or more aspects of this invention can meet certain objectives, while one or more other aspects can meet certain other objectives. Each objective may not apply equally, in all its respects, to every aspect of this invention. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to specific embodiments, it will be appreciated that the description is illustrative of the invention and is not constructed as limiting of the invention.

DETAILED DESCRIPTION OF A PREFERRED EMBODIMENT

With reference to the drawings, the invention will now be described in more detail. Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are herein described.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

Figure 1:
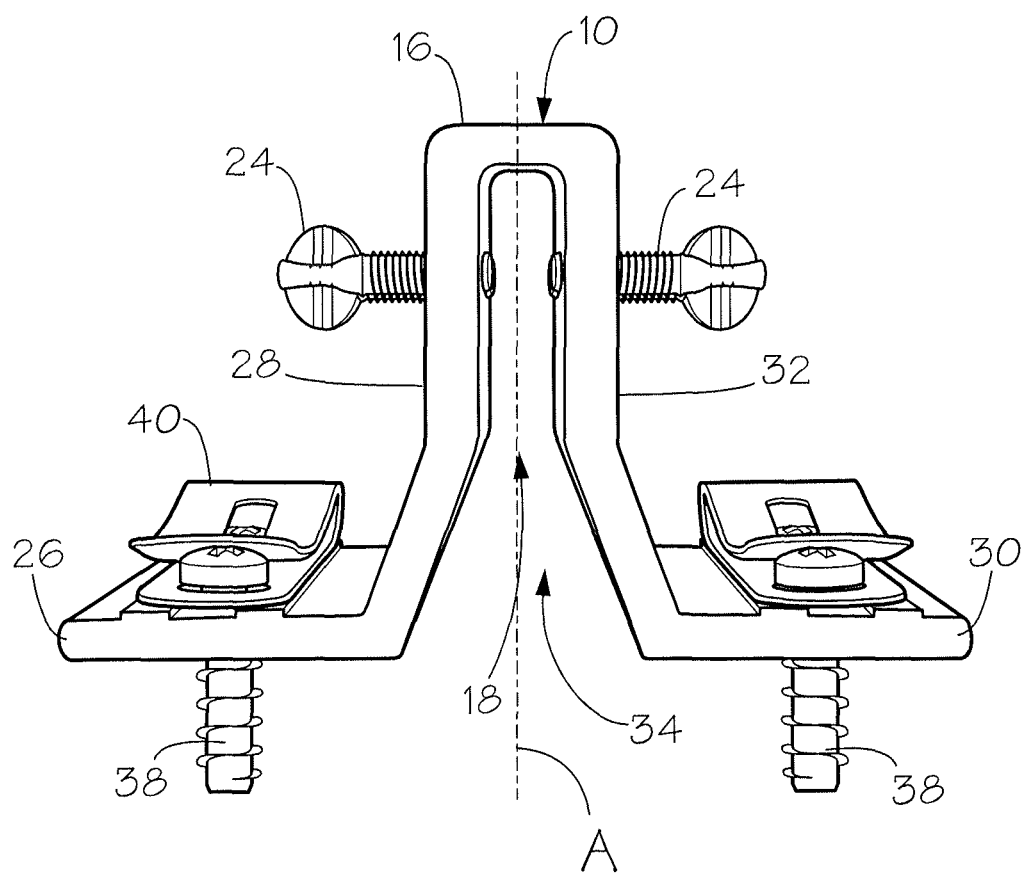
FIG. 1 shows a front elevation view of a bracket according to the present invention.
Figure 2:
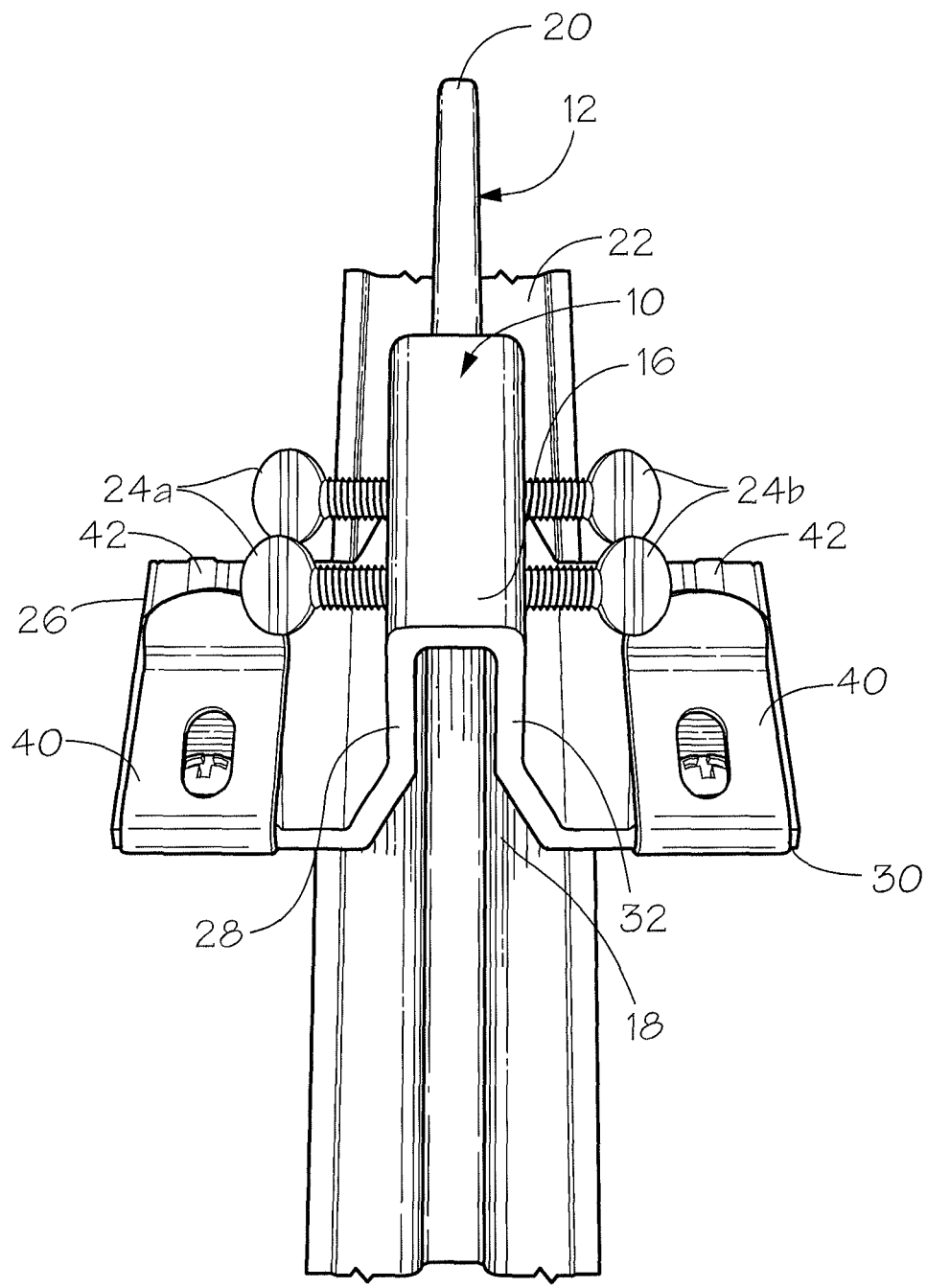
FIG. 2 shows a top perspective view of the bracket and carrying bars according to the present invention.

Referring to FIGS. 1-3, a bracket, designated generally as 10, is shown for mounting ceiling panels 14 to suspended carrying bars 12. A plurality of carrying bars 12 are arranged in a room generally near the ceiling and define a suspended mounting grid for receiving brackets 10 to carry a plurality of ceiling panels 14.

Bracket 10 includes a U-shaped central portion 16 defining a mounting channel, designated generally as 18. Mounting channel 18 is adapted to receive a portion of suspended carrying bars 12. In the illustrated embodiment, carrying bars 12 have a T-shape with a first wall portion 20 extending in a vertical arrangement, and a second wall portion 22 extending in a horizontal arrangement First and second wall portions 20 and 22 are accordingly perpendicular to each other. Mounting channel 18 receives first wall portion 20 of carrying bars 12 in interlocking engagement.

To facilitate interlocking engagement between bracket 10 and carrying bar 12, bracket 10 includes at least one adjustable securing member 24 carried by said central portion 16 for releasably engaging first wall portion 20 of suspended carrying bars 12. In the illustrated embodiment, the at least one adjustable securing member 24 comprises a thumb screw extending into mounting channel 18 so that rotation of the thumb screw directs interlocking engagement and disengagement of bracket 10 from suspended carrying bars 12. Referring to FIG. 2, in a preferably embodiment, a first pair of laterally spaced thumb screws 24a are disposed on a first side of central portion 16, and a second pair of laterally spaced thumb screws 24b are disposed on a second side of central portion 16 for evenly distributing engagement force loads against first wall portion 20 of suspended carrying bars 12.

Figure 5:
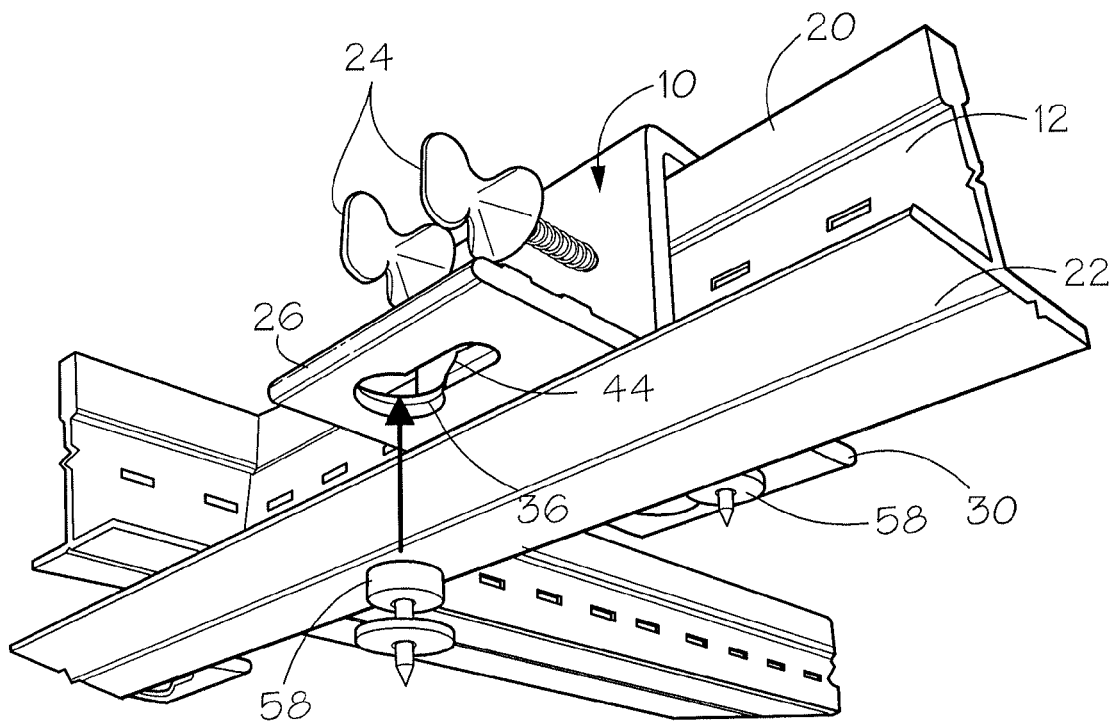
FIG. 5 shows a perspective exploded view of an alignment marker carried by the bracket according to the present invention.
Figure 6A:
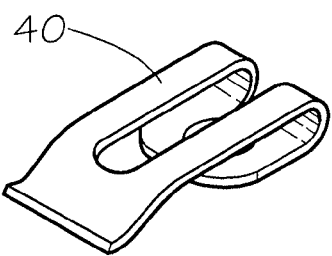
FIG. 6A shows a perspective view of the securing clip according to the present invention.
Figure 6B:
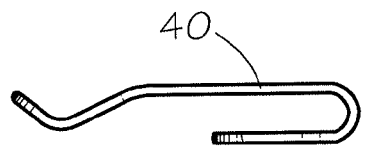
FIG. 6B shows a side view of the securing clip according to the present invention; and, FIG. 6C shows a top view of the securing clip according to the present invention.
Figure 6C:
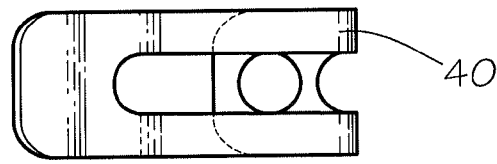

Referring to FIG. 1, bracket 10 includes a first support arm 26 extending laterally outward from a first side 28 of central portion 16. In the illustrated embodiment, first support arm 26 extends perpendicular to a first axis, designated as A, defining a depth of mounting channel 16. Bracket 10 further includes a second support arm 30 extending laterally outward from a second side 32 of central portion 16. In the illustrated embodiment, second support arm 30 extends perpendicular to first axis A. In a further advantageous embodiment, first and second support arms 26, 30 are aligned in a common plane and located adjacent to a mouth 34 of mounting channel 18. Referring to FIGS. 2, 3, and 5, in the illustrated embodiment, first and second support arms 26, 30 engage second wall portion 22 of carrying bars 12 when said first wall portion 20 is received into mounting channel 18. Accordingly, bracket 10 if stabilized on carrying bars 12 and further distributes the weight load of bracket 10 across the given carrying bar 12.

Referring to FIGS. 3 and 5, bracket 10 includes a keyway, designated generally as 36, disposed in each of first and second support arms 26, 30. Keyway 36 is adapted to receive a ceiling panel connecting member 38. Each ceiling panel 14 includes a ceiling panel connecting member 38 disposed at various location along a given ceiling panel 14 for engaging a keyway 36 in either of first support arm 26 or second support arm 30 of a given bracket 10 so that ceiling panel 14 is carried by bracket 10 on carrying bars 12.

Referring to FIGS. 1, 2, 4 and 6A-6C, a securing clip 40 is carried on each of first and second support arms 26, 30. Securing clip 40 engages ceiling panel connecting member 38 to resist removal of ceiling panel connecting member 38 from keyway 36 to prevent accidental dislodgement of ceiling panels 14. In the illustrated embodiment, securing clip 40 comprises a spring clip. The spring clip is adapted to releasably engage ceiling panel connecting member 38 by flexing during engagement to allow for movement of ceiling panel connecting member 38 within keyway 36 between a locked position within and retained by spring clip 40, and an unlocked position outside of spring clip 40. FIG. 4 shows ceiling panel connecting member 38 in a locked position retained within spring clip 40. By sliding ceiling panel connecting member 38 horizontally in keyway 36 with sufficient force, spring clip 40 can be flexed up to allow ceiling panel connecting member 38 to move laterally to engage or disengage ceiling panel connecting member 38 from bracket 10.

Referring to FIGS. 3 and 4, in the illustrated embodiment, a plurality of reinforcing bars 42 are included on bracket 10 extending across each of first and second support arms 26, 30. Reinforcing bars 42 add strength to each of first and second support arms 26 and 30 without increasing the thickness across the entire surface of first and second support arms 26 and 30. Additionally, reinforcing bars 42 also define a platform on which a portion of ceiling panel connecting member 38 rests when in the locked position within securing clip 40. In the illustrated embodiment, keyway 36 includes a slot portion 44 disposed between at least two of reinforcing bars 42 and securing clip 40 is carried on reinforcing bars 42 overtop of slot portion 44 so that securing clip 40 is spaced from a top surface 46 of first and second support arms 26, 30. In the illustrated embodiment, securing clip 40 is secured to first and second support arms 26, 30 by a screw 48, or the like.

Referring to FIGS. 3 and 4, preferably, ceiling panel connecting member 38 preferably comprises a double headed mounting screw. Double headed mounting screw 38 includes a first head 50. First head 50 is carried on top of reinforcing bars 42 adjacent slot portion 44 of keyway 36 when disposed in keyway 36 and engaging securing clip 40 in a locked position. Double headed mounting screw 38 further includes a second head 52 engaging a bottom surface 54 of first and second support arms 26, 30 when in the locked position. Double headed mounting screw 38 also includes a connecting shaft 56 between first head and second head 50, 52, wherein connecting shaft 56 is disposed in slot portion 44 of keyway 36 when in the locked position.

Referring to FIG. 5, to facilitate the installation process, an alignment marker 58 may be inserted into keyway 36. Alignment marker 58 includes a pointed tip which forms an indent on ceiling panel 14 when pressed against alignment marker 58. Once the indent is made on ceiling panel 14, alignment marker 58 can be removed from keyway 36 and ceiling panel connecting member 38 installed into ceiling panel 14 at the indent location to provide a precise alignment and connection between ceiling panel 14 and bracket 10.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A bracket for mounting ceiling panels to suspended carrying bars, said bracket comprising:
    a U-shaped central portion defining a mounting channel adapted to receive a portion of the suspended carrying bars;
    a first support arm extending laterally outward from a first side of said central portion and perpendicular to a first axis defining a depth of said mounting channel;
    a second support arm extending laterally outward from a second side of said central portion and perpendicular to said first axis;
    a plurality of reinforcing bars extending across each of said first and second support arms;
    a keyway disposed in each of said first and second support arms receiving a ceiling panel connecting member; and,
    a securing clip carried on each of said first and second support arms engaging said ceiling panel connecting member to resist removal of said ceiling panel connecting member from said keyway.

2. The bracket of claim 1 including at least one adjustable securing member carried by said central portion for releasably engaging said suspended carrying bars.

3. The bracket of claim 2 wherein said at least one adjustable securing member comprises a thumb screw extending into said mounting channel so that rotation of said thumb screw directs engagement and disengagement with said suspended carrying bars.

4. The bracket of claim 3 including a first pair of laterally spaced thumb screws disposed on said first side of said central portion, and a second pair of laterally spaced thumb screws disposed on said second side of said central portion for evenly distributing engagement force loads against said suspended carrying bars.

5. The bracket of claim 1 wherein said keyway includes a slot portion disposed between at least two of said reinforcing bars.

6. The bracket of claim 5 wherein said securing clip is carried on said reinforcing bars and disposed overtop of said slot portion of said keyway so that said securing clip is spaced from a top surface of said first and second support arms.

7. The bracket of claim 5 wherein said ceiling panel connecting member comprises a double headed mounting screw.

8. The bracket of claim 7 wherein said double headed mounting screw includes a first head carried on top of said reinforcing bars adjacent said slot portion of said keyway when engaging said securing clip in a locked position.

9. The bracket of claim 8 wherein said double headed mounting screw includes a second head engaging a bottom surface of said first and second support arms when in said locked position.

10. The bracket of claim 9 wherein said double headed mounting screw includes a connecting shaft between said first head and said second head, wherein said connecting shaft is disposed in said slot portion of said keyway when in said locked position.

11. The bracket of claim 1 wherein said securing clip comprises a spring clip adapted to releasably engage said ceiling panel connecting member by flexing during engagement to allow for movement of said ceiling panel connecting member within said keyway between a locked position within said spring clip, and an unlocked position outside of said spring clip.

12. The bracket of claim 1 wherein said first and second support arms are aligned in a common plane and located adjacent to a mouth of said mounting channel.

13. A ceiling panel mounting system comprising:
a plurality of carrying bars for defining a suspended mounting grid;
a bracket having U-shaped central portion defining a mounting channel adapted to receive a portion of said carrying bars;
said bracket having a first support arm extending laterally outward from a first side of said central portion;
said bracket having a second support arm extending laterally outward from a second side of said central portion;
said bracket having a keyway disposed in each of said first and second support arms;
a ceiling panel having a ceiling panel connecting member engaging said keyway in either of said first support arm or said second support arm of said bracket so that said ceiling panel is carried by said bracket on said carrying bars; and,
a securing clip carried on each of said first and second support arms engaging said ceiling panel connecting member to resist removal of said ceiling panel connecting member from said keyway.

14. The mounting system of claim 13 wherein said carrying bars have a T-shape with a first wall portion extending in a vertical arrangement and a second wall portion extending in a horizontal arrangement.

15. The mounting system of claim 14 wherein said mounting channel of said bracket receives said first wall portion of said carrying bars in interlocking engagement.

16. The mounting system of claim 15 wherein said first and second support arms engage said second wall portion of said carrying bars when said first wall portion is received into said mounting channel.

17. The mounting system of claim 16 including at least one adjustable securing member carried by said central portion for releasably engaging said first wall portion of said carrying bars.

18. The mounting system of claim 13 including a plurality of reinforcing bars extending across each of said first and second support arms.

19. The mounting system of claim 13 wherein said securing clip comprises a spring clip adapted to releasably engage said ceiling panel connecting member by flexing during engagement to allow for movement of said ceiling panel connecting member within said keyway between a locked position within said spring clip, and an unlocked position outside of said spring clip.

\* \* \* \* \*